US009524317B2

(12) United States Patent
Branish, II et al.

(10) Patent No.: US 9,524,317 B2
(45) Date of Patent: Dec. 20, 2016

(54) OPTIMIZATION OF AGGREGATE QUERIES IN DATABASE MANAGEMENT SYSTEMS USING AN EARLY OUT JOIN WHEN PROCESSING MIN AND MAX FUNCTIONS

(75) Inventors: Edward Gust Branish, II, Tonawanda, NY (US); John F. Hornibrook, Markham (CA); Dieu Quang La, Markham (CA); Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 11/845,031

(22) Filed: Aug. 24, 2007

(65) Prior Publication Data

US 2009/0055350 A1 Feb. 26, 2009

(51) Int. Cl.
*G06F 17/30* (2006.01)

(52) U.S. Cl.
CPC .............................. *G06F 17/30454* (2013.01)

(58) Field of Classification Search
CPC ................... G06F 17/30286; G06F 17/30389;
G06F 17/30392; G06F 17/30412; G06F
17/30433; G06F 17/30442; G06F
17/30448; G06F 17/30451; G06F
17/30454; G06F 17/30466
USPC ................................................ 707/713–714
See application file for complete search history.

(56) References Cited

U.S. PATENT DOCUMENTS

| 5,548,754 | A | 8/1996 | Pirahesh et al. |
| 5,548,758 | A | 8/1996 | Pirahesh et al. |
| 5,590,324 | A | 12/1996 | Leung et al. |
| 5,598,559 | A | 1/1997 | Chaudhuri |
| 5,619,692 | A | 4/1997 | Malkemus et al. |
| 5,761,657 | A | 6/1998 | Hoang |
| 5,781,896 | A | 7/1998 | Dalal |
| 5,884,299 | A | 3/1999 | Ramesh et al. |
| 6,092,062 | A | 7/2000 | Lohman et al. |
| 6,240,406 | B1 | 5/2001 | Tannen |
| 6,339,769 | B1 | 1/2002 | Cochrane et al. |
| 6,339,770 | B1 | 1/2002 | Leung et al. |
| 6,460,027 | B1 | 10/2002 | Cochrane et al. |
| 2003/0172059 | A1* | 9/2003 | Andrei ............................. 707/3 |
| 2003/0182276 | A1* | 9/2003 | Bossman et al. ................. 707/3 |
| 2004/0220908 | A1* | 11/2004 | Finlay et al. .................... 707/3 |
| 2004/0220923 | A1* | 11/2004 | Nica ................................. 707/3 |

(Continued)

OTHER PUBLICATIONS

[PIRA92]; Hamid Pirahesh, Joseph Hellerstein, and Waciar Hasan, "Extensible/Rule Based Query Rewrite Optimization in Starburst," Proceedings of ACM SIGMOD '92 International Conference on Management of Data, San Diego, Calif. 1992; pp. 1-10.*

(Continued)

*Primary Examiner* — Boris Gorney
*Assistant Examiner* — Amanda Willis
(74) *Attorney, Agent, or Firm* — Janaki K. Davda; Konrad, Raynes, Davda & Victor LLP (57) ABSTRACT

A method, computer program product, and system for optimizing aggregate queries are provided. The method, computer program product, and system provide for receiving an aggregate query comprising a GROUP BY operation and an aggregate function, creating an access plan for executing the aggregate query, the access plan including a join between an outer relation and an inner relation, and designating the join included in the access plan as an early out join.

23 Claims, 4 Drawing Sheets

(56) References Cited

U.S. PATENT DOCUMENTS

2014/0317085 A1* 10/2014 Wehrmeister ..... G06F 17/30463
707/714

OTHER PUBLICATIONS

Chaudhuri, Surajit, et al., Including Group-By in Query Optimization, Proceedings of the 20th VLDB Conference Santiago, Chile, 1994, pp. 354-366.
Yan, Weipeng P., et al., "Performing Group-By before Join", Proceedings of the 10th IEEE International Conference on Data Engineering, 1994, pp. 89-100.
Simmen, David, et al., "Fundamental Techniques for Order Optimization", Proceedings ACM SIGMOD International Conference on Management Data, Jun. 1996, pp. 57-67.
Selinger, P.G., et al., "Access Path Selection in a Relational Database Management System", ACM SIGMOD International Conference on the Management Data, 1979, pp. 23-34.
Gupta, Ashish, et al., "Aggregate-Query Processing in Data Warehousing Environments", Proceedings of the 21st BLDB Conference, 1995, 12 pages.
Chiou, Andy S., et al, "Optimization for Queries with Holistic Functions", IEEE, 2001, pp. 327-334.
Zhang, Chang N., et al., "An Efficient Authentication Scheme with Fault Tolerance for Database Systems", Computer Society, Proceedings of the Third International Conference on Information Technology and Application (ICITA '05), 2005, 6 pages.

* cited by examiner

OPTIMIZATION OF AGGREGATE QUERIES IN DATABASE MANAGEMENT SYSTEMS USING AN EARLY OUT JOIN WHEN PROCESSING MIN AND MAX FUNCTIONS

FIELD OF THE INVENTION

The present invention relates generally to optimization of aggregate queries in database management systems.

BACKGROUND OF THE INVENTION

Aggregate queries are becoming increasingly popular, especially in time series applications (e.g., applications that stream stock prices, sports scores, and the like). Queries from such applications often involve looking back and/or forward in time for a most recent record satisfying some search condition for a set of values (e.g., stock symbols). Many techniques are available for optimizing aggregate queries. These optimization techniques, however, typically require retrieving all qualifying rows (e.g., all rows satisfying one or more search conditions specified in a query) from base relations (e.g., tables involved in the one or more search conditions specified in the query) to compute a result set. For certain types of applications, such as time series applications, the delay resulting from the number of input/outputs (I/Os) needed to compute the result set is unacceptable.

SUMMARY OF THE INVENTION

A method, computer program product, and system for optimizing aggregate queries are provided. The method, computer program product, and system provide for receiving an aggregate query comprising a GROUP BY operation and an aggregate function, the aggregate function being a MAX function or a MIN function, creating an access plan for executing the aggregate query, the access plan including a join between an outer relation and an inner relation, and designating the join included in the access plan as an early out join such that upon execution of the aggregate query in accordance with the access plan, for each row in the outer relation to be joined to one or more qualifying rows in the inner relation, only a first of the one or more qualifying rows in the inner relation is retrieved to compute a result set for the aggregate query, each qualifying row in the inner relation being a row that satisfies one or more predicates of the aggregate query.

DETAILED DESCRIPTION

The present invention generally relates to optimization of aggregate queries in database management systems. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

In certain types of applications, such as data warehouse and time series applications, aggregate queries (e.g., queries that include aggregate functions, such as MAX, MIN, AVG, SUM, and the like) are frequently used. For instance, queries from time series applications (e.g., applications that stream stock prices, sports scores, and the like) often involve looking back and/or forward in time for a most recent record satisfying some search condition for a set of values (e.g., stock symbols).

Whenever a query is submitted to a database management system, an optimal access plan will be produced for the query. An access plan for a query defines a sequence of operations that have to be performed in order to return a result set for the query. Typically, to produce an optimal access plan, multiple alternate access plans are created for each query. The optimal access plan is then selected based on, for instance, cost. Access plans are usually created using a bottom up approach. With a bottom up approach, subplans that define a sequence of operations needed to return a result set for various portions of a query are created. These subplans are then used to build larger subplans that cover larger portions of the query. This process continues until an access plan for the entire query is produced.

Many techniques are available for optimizing aggregate queries. Some techniques maintain indexes on aggregated columns (e.g., columns involved in aggregate functions) and utilize these indexes instead of base relations (e.g., relations specified in queries) to improve performance of aggregate queries. Other techniques evaluate aggregate queries in parallel by dividing data into multiple nodes, performing local aggregation on each node, then performing global aggregation to coalesce a result.

However, these optimization techniques require retrieval of all qualifying rows (e.g., rows satisfying one or more predicates of an aggregate query) to compute an aggregate result set. For applications such as time series applications, the number of inputs/outputs (I/Os) that have to be performed to retrieve all qualifying rows simply causes too much delay. As a result, existing aggregate query optimization techniques are not suitable for certain types of applications.

Figure 1:
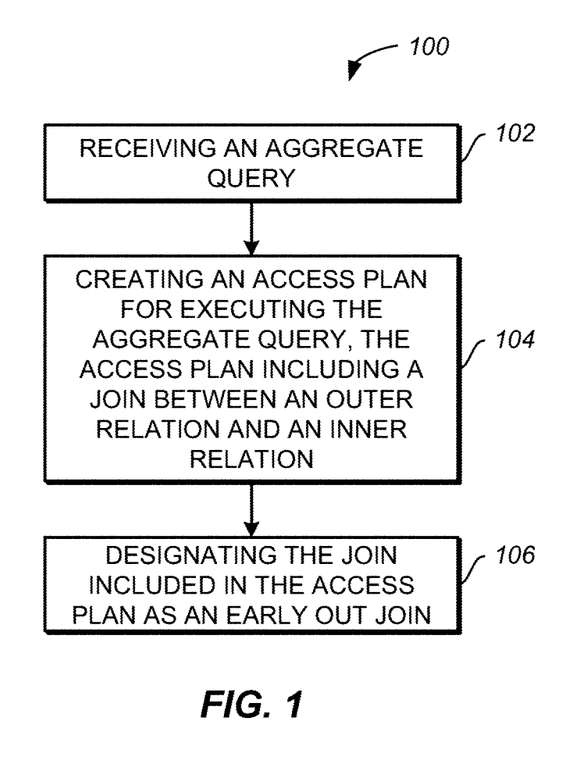
FIG. 1 depicts a process for optimizing aggregate queries according to an implementation of the invention.

Depicted in FIG. 1 is a process 100 for optimizing aggregate queries according to an implementation of the invention. At 102, an aggregate query comprising a GROUP BY operation and an aggregate function is received. In the implementation, the aggregate function is a MAX function or a MIN function. More than one aggregate function may be included in the aggregate query.

An access plan for executing the aggregate query is created at 104. In the implementation, the access plan includes a join between an outer relation and an inner relation. When an outer relation is joined to an inner relation, for each row in the outer relation, the inner relation will be scanned to locate rows from the inner relation to be joined to the outer relation. In one implementation, the outer relation and the inner relation are base relations of the aggregate query. The outer relation and/or the inner relation may be derived relations (e.g., relations derived from another join) in another implementation.

At 106, the join included in the access plan is designated as an early out join such that upon execution of the aggregate query in accordance with the access plan, for each row in the outer relation to be joined to one or more qualifying rows in the inner relation, only a first of the one or more qualifying rows in the inner relation is retrieved to compute a result set for the aggregate query. Each qualifying row in the inner relation is a row that satisfies one or more predicates of the aggregate query. Hence, with an early out join, an outer row (i.e., a row from the outer relation) that would have been joined to multiple inner rows (i.e., rows from the inner relation) in a regular join will only be joined to one inner row.

Through early out joins, all qualifying rows no longer need to be retrieved in order to compute the results of aggregate queries. The cost savings could be in orders of magnitude over other approaches as each qualifying MAX/MIN result may be located in as little as a single I/O compared to potentially thousands of I/Os that may be required to return a result with other approaches. The speed up may be even more dramatic in queries with more predicates because the predicates are applied to each row retrieved. If only one or two rows are retrieved compared to hundreds or thousands of rows, then the predicates need only be applied to a few rows rather than hundreds or thousands of rows.

Set forth below is a sample aggregate query:

```
SELECT d.symbol, MAX(d.date)
FROM symbols s, dailyStockData d
WHERE s.symbol = d.symbol AND d.date <= '12/31/2005'
    AND d.close >= 10
GROUP BY d.symbol
```

Two relations are involved in the sample aggregate query above, a dailyStockData relation that stores opening and closing prices of each stock symbol for each day and a symbols relation that stores stock symbols of interest. Assume that the dailyStockData relation has an index on the symbol and date columns in ascending order and that the symbols relation has an index on the symbol column in ascending order.

The sample aggregate query is requesting stock symbols of interest that had a closing price of at least ten dollars prior to the year 2006. However, for each distinct stock symbol of interest that satisfies the closing price and date predicates, only the entry with the most recent date prior to the year 2006 is requested by the sample aggregate query.

Some approaches will create an access plan that involves joining the symbols relation with the dailyStockData relation and feeding the result of the join to a group by operator to perform the aggregation. However, for each distinct symbol value, there may be thousands of rows in the dailyStockData relation that satisfy the predicates s.symbol=d.symbol, d.date<='12/31/2005', and d.close>=10. Thus, for each distinct symbol value, some approaches will retrieve thousands of rows to perform the join. Similarly, the group by operator may need to process thousands of rows to obtain an aggregate result (i.e., the row with the most recent date prior to 2006).

In an implementation of the invention, an access plan is created where the symbols relation is an outer relation of a join and the dailyStockData relation is an inner relation of the join such that for each value in the symbol column of the outer relation, the dailyStockData relation is accessed via its index by binding the symbol column of the inner relation to the value in the symbol column of the outer relation and traversing the index on the date column in descending order starting from d.date<='12/31/2005'. When a column of a relation is bound to a specific value, all rows returned from the relation will have the specific value in the bounded column.

By doing so, for each value in the symbol column of the outer relation, rows are returned from the inner relation in descending order based on values in the date column. The join can then be designated as an early out join such that when the join is executed, for each value in the symbol column of the outer relation, only the first row from the inner relation satisfying all the join and local predicates will be retrieved as that is the row containing the maximum date value for that particular symbol value.

Hence, the access plan created according to the implementation of the invention will not only avoid extra I/Os required to fetch subsequent qualifying rows from the inner relation, but will also decrease the output cardinality of the join. Consequently, less processing will be required by a group by operator. Although the above example uses an index to produce the order required for the optimization, various other methods or schemes that produce the required order may be used. For example, ordering can be achieved through a sort. In addition, rows in a relation may already be stored in a particular order.

Figure 2:
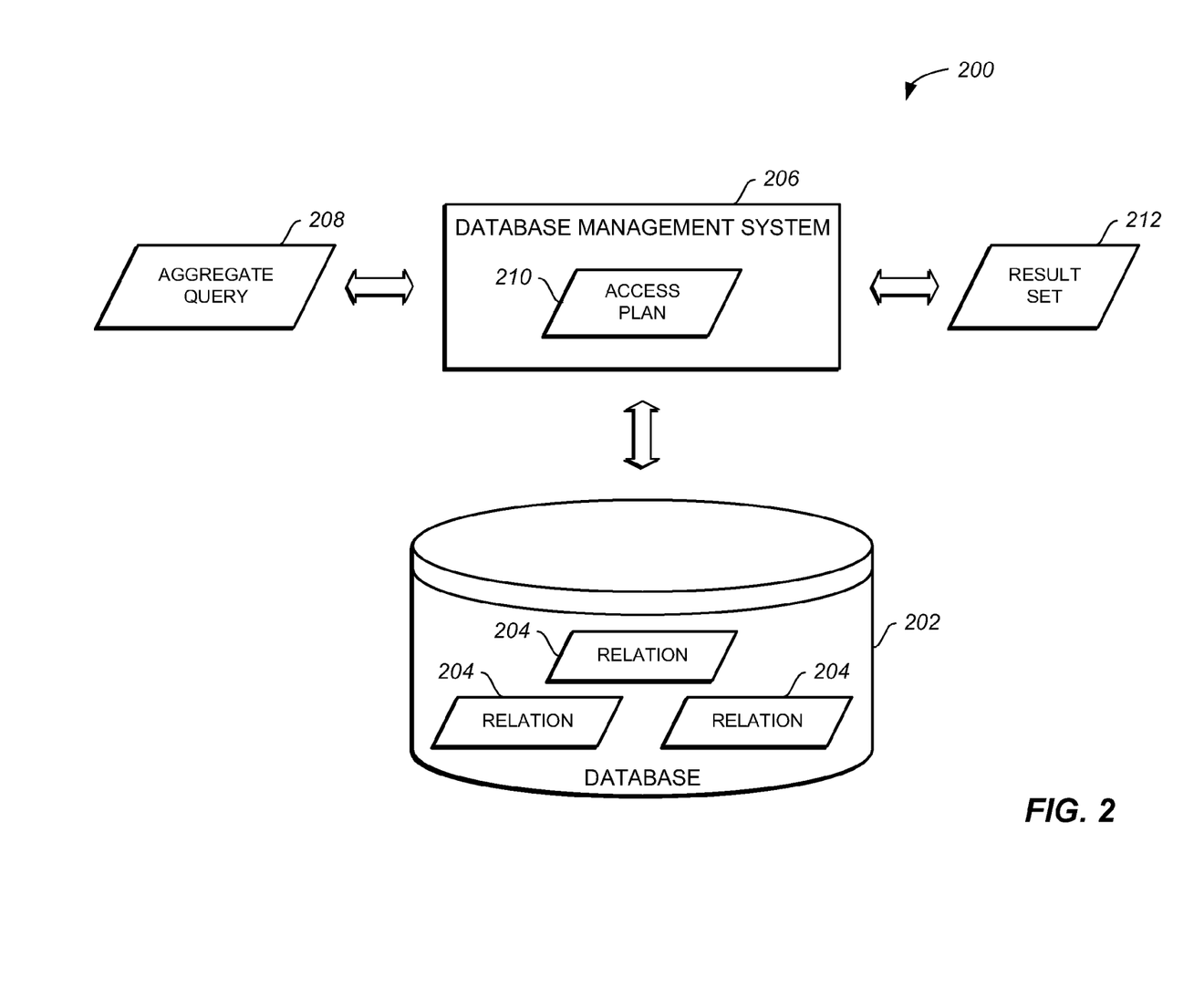
FIG. 2 illustrates a system for optimizing aggregate queries according to an implementation of the invention.

FIG. 2 illustrates a system 200 for optimizing aggregate queries according to an implementation of the invention. System 200 includes a database 202 storing a plurality of relations 204. System 200 also includes a database management system 206 managing access to the plurality of relations 204 stored in database 202. Although not illustrated in FIG. 2, system 200 may include other components, such as additional databases. The number of relations 204 illustrated as being stored in database 202 may not be reflective of the number of relations stored therein. In addition, database management system 206 may include components that are not shown, such as parser, compiler, execution engine, optimizer, and the like.

When database management system 206 receives an aggregate query 208 comprising a GROUP BY operation and an aggregate function, database management system 206 creates an access plan 210 for executing the aggregate query. The aggregate function is a MAX function or a MIN function in the implementation. Access plan 210 includes a join between an outer relation and an inner relation. One or both of the inner and outer relations may be base relations (e.g., specified in the aggregate query), derived relations (e.g., derived from another join), materialized views, and the like. In addition, one or both of the inner and outer relations may be stored in database 202.

The join in access plan 210 is then designated as an early out join such that upon execution of the aggregate query in accordance with the access plan, for each row in the outer relation to be joined to one or more qualifying rows in the inner relation, only a first of the one or more qualifying rows in the inner relation is retrieved to compute a result set 212 for the aggregate query. For example, suppose an outer relation of a join includes two rows in which the first row is to be joined to one row from an inner relation and the second row is to be joined to three rows from the inner relation. If the join is designated as an early out join, then the first row from the outer relation will still be joined to the one row from the inner relation. The second row from the outer relation, however, will only be joined to the first of the three rows from the inner relation. Hence, rather than retrieving four rows, only two rows will be retrieved.

In one implementation, the join in the access plan is designated as an early out join where, for each row in the outer relation to be joined to one or more qualifying rows in the inner relation, (i) all rows in the inner relation to be joined to the row in the outer relation have a same value for a set of one or more group by columns of the inner relation, each of the one or more group by columns being a column involved in the GROUP BY operation, (ii) any predicate of the aggregate query not yet applied either completely filters out or completely preserves all rows in the inner relation to be joined to the row in the outer relation, (iii) all rows in the inner relation to be joined to the row in the outer relation are ordered descendingly on a column of the inner relation involved in the aggregate function when the aggregate function is a MAX function, and (iv) all rows in the inner relation to be joined to the row in the outer relation are ordered ascendingly on the column of the inner relation involved in the aggregate function when the aggregate function is a MIN function.

A second sample aggregate query is set forth below to help illustrate when the conditions in the implementation of FIG. 2 will or will not be satisfied.

```
SELECT ta.a1, ta.a2, MAX(ta.a3)
FROM ta, tb, tc
WHERE ta.a1 = tb.b1 AND ta.a2 = tc.c2 AND tb.b3 = tc.c3
GROUP BY ta.a1, ta.a2
```

In the above sample aggregate query, columns a1 and a2 are group by columns (e.g., columns involved in the GROUP BY operation), relation ta is a source of the group by columns (e.g., relation involved in the GROUP BY operation), and predicates ta.a1=tb.b1 and ta.a2=tc.c2 are group by column binding predicates (e.g., equality predicates where one side of the equality is a source of a group by column and the other side of the equality does not depend on the source of the group by column). Additionally, MAX is an aggregate function, column a3 is an aggregated column (e.g., column involved in the aggregate function), and relation ta is a source of the aggregated column (e.g., relation involved in the aggregate function).

With predicates ta.a1=tb.b1 and ta.a2=tc.c2 and tb.b3=tc.c3, various join permutations are possible. In one option, relation tb is joined to relation ta and the derived relation from the join of tb to ta is joined to relation tc. In another option, relation tc is joined to relation ta and the derived relation from the join of tc to ta is joined to relation tb. In a third option, relation tb is joined to relation tc and the derived relation from the join of tb to tc is joined to relation ta. Assume for the options above that the first relation of a join is the outer relation and the second relation of the join is the inner relation.

If the first option is selected, then the first condition above (i.e., for each row in the outer relation to be joined to one or more qualifying rows in the inner relation, all rows in the inner relation to be joined to the row in the outer relation have a same value for a set of one or more group by columns of the inner relation) would not be satisfied. Specifically, if relation tb is joined to relation ta, then, for any one row from relation tb, all values in column a1 of rows from relation ta to be joined to the one row from relation tb will be the same since they all have to be equal to the value in column b1 of the one row from relation tb. However, there is no guarantee that all values in column a2 of the rows from relation ta to be joined to the one row from relation tb will be the same.

The second option fails to satisfy the first condition for similar reasons. In particular, if relation tc is joined to relation ta, for any one row from relation tc, all values in column a2 of rows from relation ta to be joined to the one row from relation tc will be the same since they all have to be equal to the value in column c2 of the one row from relation tc. However, the rows from relation ta to be joined to the one row from relation tc may have different values in column a1.

The third option, on the other hand, does satisfy the first condition because if a relation derived from the joining of tb to tc is joined to relation ta, for any one row from the derived relation, all values in columns a1 and a2 of rows from relation ta to be joined to the one row from the derived relation will be the same.

Assume the third option is selected and that for one of the rows from the derived relation, three rows from relation ta, which are set forth below, will be joined to the one row from the derived relation:

| a1 | a2 | a3 | a4 |
|----|----|----|----|
| 1  | 3  | 9  | 0  |
| 1  | 3  | 8  | 2  |
| 1  | 3  | 7  | 2  |

In addition, assume that the second sample aggregate query includes a third predicate a4=2 that has not been applied. Only the second row and third row of the three rows from relation ta satisfies the third predicate. In other words, the third predicate will only filter out the first of the three rows from relation ta. As a result, the second condition (i.e., for each row in the outer relation to be joined to one or more qualifying rows in the inner relation, any predicate of the aggregate query not yet applied either completely filters out or completely preserves all rows in the inner relation to be joined to the row in the outer relation) will not be satisfied.

However, if the third predicate is not included in the second sample aggregate query, then both the second condition and the third condition (i.e., for each row in the outer relation to be joined to one or more qualifying rows in the inner relation, all rows in the inner relation to be joined to the row in the outer relation are ordered descendingly on a column of the inner relation involved in the aggregate function when the aggregate function is a MAX function) will be satisfied because column a3 is the column involved in the MAX aggregate function and the three rows from relation ta are ordered descendingly on column a3. The descending order allows for retrieval of only the first qualifying row from relation ta, which can greatly reduce overall number of I/Os and improve query performance.

Set forth below is a third sample aggregate query to illustrate whether the second condition in the implementation of FIG. 2 will or will not be satisfied.

```
SELECT ta.a1, MIN(ta.a0)
FROM ta, tb, tc
WHERE ta.a1 = tb.b1 AND ta.a1 = tc.c1
GROUP BY ta.a1
```

Assume that relation tb is joined to relation ta and that predicate ta.a1=tc.c1 has not been applied. Under these circumstances, the second condition will be satisfied. Specifically, for any one row from relation tb, all values in column a1 of rows from relation ta to be joined to the one row from relation tb will be the same. Since all rows from relation ta will have the same value in column a1, that value will either be equal to or not equal to any given value in column c1 of relation tc. Thus, if the value in column a1 matches the given value in column c1, then all rows from relation ta to be joined to the one row from relation tb will be preserved. On the other hand, if the value in column a1 does not match the given value in column c1, then all rows from relation ta to be joined to the one row from relation tb will be filtered out.

Figure 3:
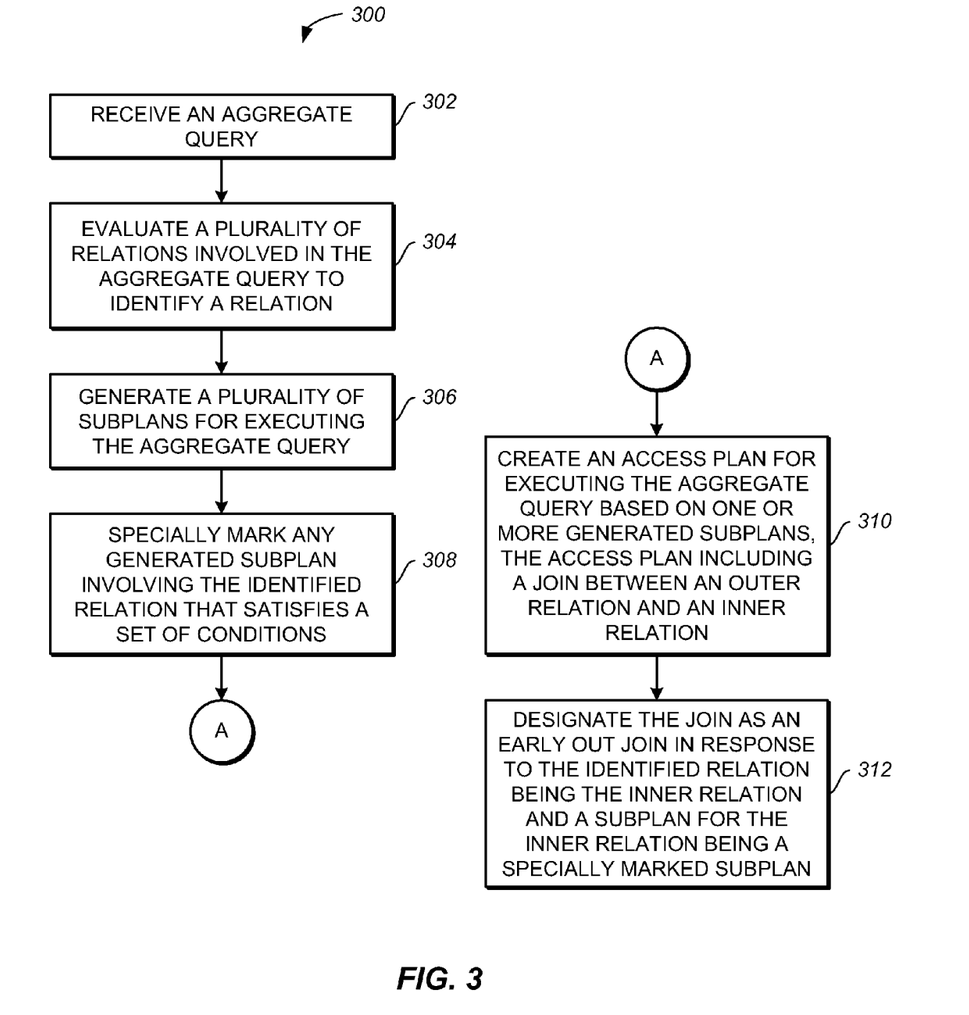
FIG. 3 shows a process for optimizing aggregate queries according to an implementation of the invention.

Shown in FIG. 3 is a process for optimizing aggregate queries according to an implementation of the invention. At 302, an aggregate query comprising a GROUP BY operation and an aggregate function is received. In one implementation, the aggregate function is a MAX function. In another implementation, the aggregate function is a MIN function.

At 304, a plurality of relations involved in the aggregate query are evaluated to identify a relation that is (i) a source of a column involved in the GROUP BY operation, (ii) a source of a column involved in the aggregate function, and (iii) involved in a join that feeds the GROUP BY operation. Evaluation of relations involved in the aggregate query allows for detection of which relation(s), if any, has the potential of being an inner relation in a join that has the possibility of being designated as an early out join. In one implementation, each relation identified is associated with a potential early join attribute, such as by marking the relation.

A plurality of subplans are generated for executing the aggregate query at 306. At 308, any generated subplan involving the identified relation that satisfies a set of conditions is specially marked. In one implementation, a generated subplan involving the identified relation is specially marked in response to the generated subplan producing an output in which, for each row from another relation involved in the join that feeds the GROUP BY operation, (i) all rows from the identified relation to be joined to the row from the other relation have a same value for a set of one or more group by columns of the identified relation, (ii) any predicate of the aggregate query not yet applied either completely filters out or completely preserves all rows from the identified relation to be joined to the row from the other relation, (iii) all rows from the identified relation to be joined to the row from the other relation are ordered descendingly on the column involved in the aggregate function when the aggregate function is a MAX function, and (iv) all rows from the identified relation to be joined to the row from the other relation are ordered ascendingly on the column involved in the aggregate function when the aggregate function is a MIN function.

At 310, an access plan for executing the aggregate query is created based on one or more of the plurality of subplans generated. The access plan includes a join between an outer relation and an inner relation. The join in the access plan is designated as an early out join at 312 in response to (i) the identified relation being the inner relation of the join and (ii) a subplan for the inner relation of the join being a specially marked subplan.

The implementation shown in FIG. 3 can be integrated with cost-based optimization to ensure that the best access plan is created for each query and set of relations. With cost-based optimization, subplans are often pruned from the bottom up in order to reduce the search space that will need to be considered in order to create the most optimal access plan for a query. Typically, when two subplans are generated for a same portion of a query and the two subplans have the similar properties, the subplan with the higher cost will be pruned.

When integrating the implementation shown in FIG. 3 with cost-based optimization, additional testing can be included to avoid pruning specially marked subplans because although a specially marked subplan may be more costly than another subplan, the specially marked subplan, if used as a subplan for an inner relation of a join, will allow the join to be designated as an early out join. As discussed above, an early out join will result in cost savings in the long run.

Additionally, testing can also be included to avoid pruning a subplan with an early out join even though it may cost more than a subplan with a regular join, because the early out join subplan has a lower cardinality. Lower cardinality leads to a reduction in costs associated with a GROUP BY operation above the join, which, in turn, could potentially lead to an access plan with lower overall costs.

In one implementation, for any join that is designated as an early out join because a subplan for an inner relation of the join is specially marked, a subplan of the join will also be specially marked. Further, any subplan that is an ancestor of an early out join subplan may also be specially marked. Specially marking related subplans may continue until a subplan for a GROUP BY operation is encountered.

A column involved in an aggregate function of an aggregate query may be nullable. If the column involved in the aggregate function is nullable, it is important to ensure that the first row retrieved from an inner relation of an early out join does not have a null value in the aggregated column unless all values in the aggregated column are null. To given an example, consider the following two relations ta and tb:

| ta | |
|---|---|
| a1 | a0 |
| 1 | 10 |
| 1 | 20 |
| 1 | null |
| 2 | null |
| 2 | null |

| tb |
|---|
| b1 |
| 1 |
| 2 |

In light of the above two relations, consider the following sample aggregate query:

```
SELECT ta.a1, MAX(ta.a0) as max_a0
FROM ta, tb
WHERE ta.a1 = tb.b1
GROUP BY ta.a1
```

The result set for the above sample aggregate query should be:

| a1 | max_a0 |
|---|---|
| 1 | 20 |
| 2 | null |

Assume that there is an index on columns a1 and a0 of relation ta and a property of the index specifies that null values collate high. If the sample aggregate query above is executed using an access plan where relation tb is an outer relation of a join with relation ta and, for any one row in relation tb, relation ta is accessed via its index by binding the value in column b1 from the one row in relation tb to column a1 in relation ta and traversing the index on column a0 in descending order, then when an early out join is performed (e.g., only a first qualifying row from relation ta is retrieved), a result set returned would be:

| a1 | max_a0 |
|----|--------|
| 1  | null   |
| 2  | null   |

The result set is incorrect because for the row in relation tb where column b1=1, early out join with relation ta will only return a first qualifying row from relation ta, which is incorrect because it has a null value and there is another qualifying row from relation ta with a non-null value in the aggregated column a0. Hence, in one implementation, for each row from an outer relation to be joined to one or more qualifying rows from an inner relation, only a first of the one or more qualifying rows from the inner relation is retrieved to compute a result set for an aggregate query responsive to (i) the first row having a non-nullable value in a column involved in an aggregate function of the aggregate query or (ii) none of the one or more qualifying rows having a non-nullable value in the column involved in the aggregate function.

A join in an access plan created for an aggregate query that has been designated as an early out join may also be marked as being null sensitive in response to (i) a column involved in an aggregate function of the aggregate query being nullable, (ii) an order property of a subplan for an inner relation of the join specifying null value as a highest collating value when the aggregate function is a MAX function, and (iii) the order property of the subplan for the inner relation of the join specifying null value as a lowest collating value when the aggregate function is a MIN function.

Although the sample aggregate queries above only include one aggregate function, implementations of the invention are applicable to aggregate queries with more than one aggregate function. For example, consider the following sample aggregate query:

```
SELECT ta.a1, tb.b2, MAX(ta.a0), MIN (tb.b0)
FROM ta, tb, tc
WHERE tc.c1 = tb.b2 and tb.b1 = ta.a1
GROUP BY ta.a1, tb.b2
```

In the sample aggregate query above, there are two aggregate functions, MAX (ta.a0) and MIN (tb.b0), two columns involved in the aggregate functions, column a0 from relation ta and column b0 from relation tb, and there are two relations involved in the aggregate functions, relation ta and relation tb. The conditions for designating a join in an access plan for an aggregate query as an early out join discussed above with respect to, for instance, the implementation in FIG. 2, can simply be applied independently to each relation involved in the aggregate functions.

As an example, if an access plan is generated for the sample aggregate query above where relation tc is first joined to relation tb such that relation tc is the outer relation and relation tb is the inner relation, and where the relation derived from the join of tc to tb is joined to relation ta such that the derived relation is the outer relation and relation ta is the inner relation, then both joins can be designated as early out joins because the conditions discussed above in, for instance, the implementation of FIG. 2, would be met.

With respect to evaluation of relations involved in an aggregate query to detect whether any relation has the potential of being an inner relation of a join that has the possibility of being designated as an early out join, which is discussed above in the implementation of FIG. 3, the identification criteria may need to be modified for aggregate queries with more than one aggregate function.

In one implementation, when an aggregate query includes a plurality of aggregate functions, a plurality of relations involved in the aggregate query are evaluated to identify any relation that is (i) a source of a column involved in a GROUP BY operation of the aggregate query, (ii) a source of a column involved in only one of the plurality of aggregate functions, the one aggregate function not depending on a number of rows feeding into the GROUP BY operation, and (iii) involved in a join that feeds the GROUP BY operation.

The invention can take the form of an entirely hardware implementation, an entirely software implementation, or an implementation containing both hardware and software elements. In one aspect, the invention is implemented in software, which includes, but is not limited to, application software, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 4:
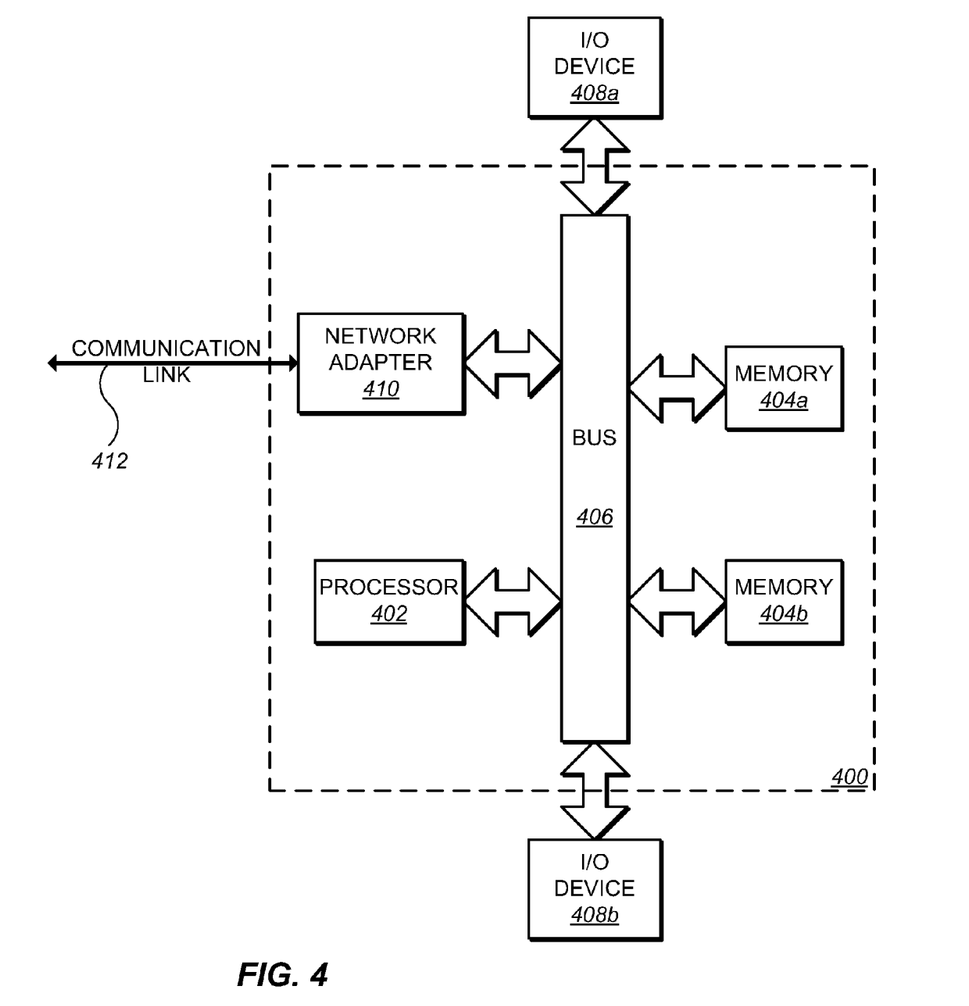
FIG. 4 depicts a block diagram of a data processing system with which implementations of the invention can be implemented.

FIG. 4 shows a data processing system 400 suitable for storing and/or executing program code. Data processing system 400 includes a processor 402 coupled to memory elements 404a-b through a system bus 406. In other implementations, data processing system 400 may include more than one processor and each processor may be coupled directly or indirectly to one or more memory elements through a system bus.

Memory elements 404a-b can include local memory employed during actual execution of the program code, bulk storage, and cache memories that provide temporary storage of at least some program code in order to reduce the number of times the code must be retrieved from bulk storage during execution. As shown, input/output or I/O devices 408a-b (including, but not limited to, keyboards, displays, pointing devices, etc.) are coupled to data processing system 400. I/O devices 408a-b may be coupled to data processing system 400 directly or indirectly through intervening I/O controllers (not shown).

In the implementation, a network adapter 410 is coupled to data processing system 400 to enable data processing system 400 to become coupled to other data processing systems or remote printers or storage devices through communication link 412. Communication link 412 can be a private or public network. Modems, cable modems, and Ethernet cards are just a few of the currently available types of network adapters.

While various implementations optimizing aggregate queries have been described, the technical scope of the present invention is not limited thereto. For example, the present invention is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of the present invention.

What is claimed is:

1. A method for optimizing aggregate queries, the method comprising:
   receiving an aggregate query comprising a GROUP BY operation, relations, and an aggregate function;
   identifying a first relation of the relations as an outer relation of a join between the outer relation and an inner relation;
   identifying a second relation of the relations as the inner relation of the join;
   marking the join as an early out join such that upon execution of the aggregate query in accordance with the access plan, each row in the outer relation is joined to a first row of one or more qualifying rows in the inner relation;
   creating a first subplan having a first cost and that includes the join that is marked as the early out join;
   creating a second subplan having a second cost and that does not include the join that is marked as the early out join;
   determining that the first subplan includes the join that is marked as the early out join and that the first cost is greater than the second cost; and
   creating an access plan that includes the first subplan based on the determination.

2. The method of claim 1, wherein the join included in the access plan is designated as an early out join where, for each row in the outer relation to be joined to one or more qualifying rows in the inner relation,
   all rows in the inner relation to be joined to the row in the outer relation have a same value for a set of one or more group by columns, each of the one or more group by columns being a column involved in the GROUP BY operation,
   any predicate of the aggregate query not yet applied either completely filters out or completely preserves all rows in the inner relation to be joined to the row in the outer relation,
   all rows in the inner relation to be joined to the row in the outer relation are ordered descendingly on a column of the inner relation involved in the aggregate function when the aggregate function is a MAX function, and
   all rows in the inner relation to be joined to the row in the outer relation are ordered ascendingly on the column of the inner relation involved in the aggregate function when the aggregate function is a MIN function.

3. The method of claim 1, further comprising:
   evaluating a plurality of relations involved in the aggregate query to identify a relation that is
   a source of a column involved in the GROUP BY operation,
   a source of a column involved in the aggregate function, and
   involved in a join that feeds the GROUP BY operation; and
   for each subplan generated that involves the identified relation, specially marking the subplan responsive to the subplan producing an output in which, for each row from another relation involved in the join that feeds the GROUP BY operation,
   all rows from the identified relation to be joined to the row from the other relation have a same value for a set of one or more group by columns, each of the one or more group by columns being a column involved in the GROUP BY operation,
   any predicate of the aggregate query not yet applied either completely filters out or completely preserves all rows from the identified relation to be joined to the row from the other relation,
   all rows from the identified relation to be joined to the row from the other relation are ordered descendingly on the column involved in the aggregate function when the aggregate function is a MAX function, and
   all rows from the identified relation to be joined to the row from the other relation are ordered ascendingly on the column involved in the aggregate function when the aggregate function is a MIN function,
   wherein the join included in the access plan is designated as an early out join responsive to the identified relation being the inner relation of the join, and
   a subplan for the inner relation of the join being a specially marked subplan.

4. The method of claim 3, further comprising:
   preventing the first subplan from being pruned in favor of the second subplan responsive to the first subplan being a specially marked subplan and the second subplan not being a specially marked subplan.

5. The method of claim 1, wherein, for each row in the outer relation to be joined to one or more qualifying rows in the inner relation, only the first of the one or more qualifying rows from the inner relation is retrieved to compute the result set for the aggregate query responsive to
   the first row having a non-nullable value in a column involved in the aggregate function, or
   none of the one or more qualifying rows having a non-nullable value in the column involved in the aggregate function.

6. The method of claim 1, wherein the inner relation of the join is a relation derived from another join.

7. The method of claim 1, further comprising:
   preventing a subplan for the join designated as an early out join from being pruned in favor of a subplan for a join that is not designated as an early out join.

8. A system for optimizing aggregate queries, wherein the system comprises:
   a processor; and
   a memory device coupled to the processor and storing program code, wherein the program code is executed by the processor to perform:
   receiving an aggregate query comprising a GROUP BY operation, relations, and an aggregate function;
   identifying a first relation of the relations as an outer relation of a join between the outer relation and an inner relation;
   identifying a second relation of the relations as the inner relation of the join;

marking the join as an early out join such that upon execution of the aggregate query in accordance with the access plan, each row in the outer relation is joined to a first row of one or more qualifying rows in the inner relation;

creating a first subplan having a first cost and that includes the join that is marked as the early out join;

creating a second subplan having a second cost and that does not include the join that is marked as the early out join;

determining that the first subplan includes the join that is marked as the early out join and that the first cost is greater than the second cost; and creating an access plan that includes the first subplan based on the determination.

9. The system of claim 8, wherein the join included in the access plan is designated as an early out join where, for each row in the outer relation to be joined to one or more qualifying rows in the inner relation, all rows in the inner relation to be joined to the row in the outer relation have a same value for a set of one or more group by columns, each of the one or more group by columns being a column involved in the GROUP BY operation, any predicate of the aggregate query not yet applied either completely filters out or completely preserves all rows in the inner relation to be joined to the row in the outer relation, all rows in the inner relation to be joined to the row in the outer relation are ordered descendingly on a column of the inner relation involved in the aggregate function when the aggregate function is a MAX function, and all rows in the inner relation to be joined to the row in the outer relation are ordered ascendingly on the column of the inner relation involved in the aggregate function when the aggregate function is a MIN function.

10. The system of claim 8, wherein the database management system further evaluates a plurality of relations involved in the aggregate query to identify a relation that is a source of a column involved in the GROUP BY operation, a source of a column involved in the aggregate function, and involved in a join that feeds the GROUP BY operation, and for each subplan generated that involves the identified relation, specially marks the subplan responsive to the subplan producing an output in which, for each row from another relation involved in the join that feeds the GROUP BY operation, all rows from the identified relation to be joined to the row from the other relation have a same value for a set of one or more group by columns, each of the one or more group by columns being a column involved in the GROUP BY operation, any predicate of the aggregate query not yet applied either completely filters out or completely preserves all rows from the identified relation to be joined to the row from the other relation, all rows from the identified relation to be joined to the row from the other relation are ordered descendingly on the column involved in the aggregate function when the aggregate function is a MAX function, and all rows from the identified relation to be joined to the row from the other relation are ordered ascendingly on the column involved in the aggregate function when the aggregate function is a MIN function, wherein the join included in the access plan is designated as an early out join responsive to the identified relation being the inner relation of the join, and a subplan for the inner relation of the join being a specially marked subplan.

11. The system of claim 10, wherein the database management system further prevents the first subplan from being pruned in favor of the second subplan responsive to the first subplan being a specially marked subplan and the second subplan not being a specially marked subplan.

12. The system of claim 8, wherein, for each row in the outer relation to be joined to one or more qualifying rows in the inner relation, only the first of the one or more qualifying rows from the inner relation is retrieved to compute the result set for the aggregate query responsive to the first row having a non-nullable value in a column involved in the aggregate function, or none of the one or more qualifying rows having a non-nullable value in the column involved in the aggregate function.

13. The system of claim 8, wherein the inner relation of the join is a relation derived from another join.

14. The system of claim 8, wherein the aggregate function is a MAX function or a MIN function.

15. The system of claim 8, wherein the inner relation is one of the plurality of relations stored in the database or the outer relation is one of the plurality of relations stored in the database.

16. The system of claim 8, wherein the database management system further prevents a subplan for the join designated as an early out join from being pruned in favor of a subplan for a join that is not designated as an early out join.

17. A computer program product comprising a non-transitory computer-readable medium, the computer readable medium encoded with a computer program for optimizing aggregate queries, wherein the computer program, when executed on a computer, causes the computer to:

receive an aggregate query comprising a GROUP BY operation, relations, and an aggregate function;

identify a first relation of the relations as an outer relation of a join between the outer relation and an inner relation;

identify a second relation of the relations as the inner relation of the join;

mark the join as an early out join such that upon execution of the aggregate query in accordance with the access plan, each row in the outer relation is joined to a first row of one or more qualifying rows in the inner relation;

create a first subplan having a first cost and that includes the join that is marked as the early out join;

create a second subplan having a second cost and that does not include the join that is marked as the early out join;

determine that the first subplan includes the join that is marked as the early out join and that the first cost is greater than the second cost; and create an access plan that includes the first subplan based on the determination.

18. The computer program product of claim 17, wherein the join included in the access plan is designated as an early out join where, for each row in the outer relation to be joined to one or more qualifying rows in the inner relation, all rows in the inner relation to be joined to the row in the outer relation have a same value for a set of one or more group by columns, each of the one or more group by columns being a column involved in the GROUP BY operation, any predicate of the aggregate query not yet applied either completely filters out or completely preserves all rows in the inner relation to be joined to the row in the outer relation, all rows in the inner relation to be joined to the row in the outer relation are ordered descendingly on a column of the inner relation involved in the aggregate function when the aggregate function is a MAX function, and all rows in the inner relation to be joined to the row in the outer relation are ordered ascendingly on the column of the inner relation involved in the aggregate function when the aggregate function is a MIN function.

19. The computer program product of claim 17, wherein the computer program further causes the computer to:

evaluate a plurality of relations involved in the aggregate query to identify a relation that is a source of a column involved in the GROUP BY operation, a source of a column involved in the aggregate function, and involved in a join that feeds the GROUP BY operation; and for each subplan generated that involves the identified relation, specially mark the subplan responsive to the subplan producing an output in which, for each row from another relation involved in the join that feeds the GROUP BY operation, all rows from the identified relation to be joined to the row from the other relation have a same value for a set of one or more group by columns, each of the one or more group by columns being a column involved in the GROUP BY operation, any predicate of the aggregate query not yet applied either completely filters out or completely preserves all rows from the identified relation to be joined to the row from the other relation, all rows from the identified relation to be joined to the row from the other relation are ordered descendingly on the column involved in the aggregate function when the aggregate function is a MAX function, and all rows from the identified relation to be joined to the row from the other relation are ordered ascendingly on the column involved in the aggregate function when the aggregate function is a MIN function, wherein the join included in the access plan is designated as an early out join responsive to the identified relation being the inner relation of the join, and a subplan for the inner relation of the join being a specially marked subplan.

20. The computer program product of claim 19, wherein the computer program further causes the computer to:

prevent the first subplan from being pruned in favor of the second subplan responsive to the first subplan being a specially marked subplan and the second subplan not being a specially marked subplan.

21. The computer program product of claim 17, wherein, for each row in the outer relation to be joined to one or more qualifying rows in the inner relation, only the first of the one or more qualifying rows from the inner relation is retrieved to compute the result set for the aggregate query responsive to the first row having a non-nullable value in a column involved in the aggregate function, or none of the one or more qualifying rows having a non-nullable value in the column involved in the aggregate function.

22. The computer program product of claim 17, wherein the inner relation of the join is a relation derived from another join.

23. The computer program product of claim 17, wherein the computer program further causes the computer to:

prevent a subplan for the join designated as an early out join from being pruned in favor of a subplan for a join that is not designated as an early out join.

* * * * *